United States Patent
Tanke, II et al.

(10) Patent No.: US 6,408,235 B1
(45) Date of Patent: Jun. 18, 2002

(54) END-OF-TRAVEL IMPACT MANAGEMENT SYSTEM

(75) Inventors: Eugene Thomas Tanke, II, Vassar; Ashok Chandy, Fenton; Julie Ann Kleinau, Bay City; Steven James Collier-Hallman, Frankenmuth, all of MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 09/664,183

(22) Filed: Sep. 18, 2000

Related U.S. Application Data

(60) Provisional application No. 60/154,612, filed on Sep. 17, 1999, and provisional application No. 60/154,683, filed on Sep. 17, 1999.

(51) Int. Cl.[7] .............................. B62D 5/06; B62D 6/02; G05D 17/02
(52) U.S. Cl. ..................... 701/41; 280/777; 180/446; 180/443
(58) Field of Search ........................... 701/41; 180/443, 180/446, 422, 442, 421, 429; 280/777

(56) References Cited

U.S. PATENT DOCUMENTS

| | | | |
|---|---|---|---|
| 4,660,671 A | 4/1987 | Behr et al. .................... 180/142 |
| 4,875,541 A | * 10/1989 | Oshita et al. ................ 180/79.1 |
| 4,951,199 A | * 8/1990 | Whitehead ............... 364/424.05 |
| 5,213,173 A | * 5/1993 | Konishi et al. ............. 180/79.1 |
| 5,267,627 A | 12/1993 | Frank et al. .................. 180/132 |
| 5,282,523 A | 2/1994 | Mueller et al. .............. 192/139 |
| 5,427,411 A | * 6/1995 | Iwasaki et al. .............. 280/777 |
| 5,473,539 A | 12/1995 | Shimizu et al. ......... 364/424.05 |
| 5,513,720 A | * 5/1996 | Yamamoto et al. .......... 180/141 |
| 5,563,790 A | 10/1996 | Wada et al. ............. 364/424.05 |
| 5,602,735 A | 2/1997 | Wada .................... 364/424.051 |
| 5,699,249 A | * 12/1997 | Noro et al. ............ 364/424.052 |
| 5,743,351 A | * 4/1998 | McLaughlin ................. 180/446 |
| 5,924,518 A | 7/1999 | D'Onoforio ................. 180/444 |
| 5,941,338 A | 8/1999 | Miller et al. ................. 180/421 |
| 6,041,887 A | * 3/2000 | Kojo et al. ................... 180/446 |
| 6,049,746 A | 4/2000 | Southward et al. ............ 701/37 |
| 6,101,435 A | * 8/2000 | Baughn et al. ................ 701/41 |
| 6,212,453 B1 | * 4/2001 | Kawagoe et al. .............. 701/41 |

* cited by examiner

Primary Examiner—Tan Nguyen
Assistant Examiner—Dalena Tran
(74) Attorney, Agent, or Firm—Edmund P. Anderson

(57) ABSTRACT

A system and method for controlling the collisions between elements of an automotive rack and pinion steering apparatus and an end-of-travel stop is presented. The system comprises a sensor for sensing a set of dynamic variables of the rack and pinion steering apparatus and operative thereby to generate as output therefrom a first set of signals indicative of the set of dynamic variables; a controller responsive to the first set of signals and operative thereby to provide as output therefrom a modified torque assist command; and a motor drive assembly drive assembly responsive to the modified torque assist command and operative thereby to provide modified torque assistance to the rack and pinion steering apparatus. In another embodiment, the dynamic data is used to calculate a torque limit to be imposed upon the torque assist command whenever the steering system is close to end-of-stop. The two embodiments may also be superimposed. The invention reduces torque at end-of-travel impacts, and helps preserve the mechanical integrity of the power steering system.

30 Claims, 9 Drawing Sheets

END-OF-TRAVEL IMPACT MANAGEMENT SYSTEM

CROSS-REFERENCE TO RELATED APPLICATIONS

This application claims the benefit of U.S. Provisional Patent Application Nos. 60/154,612, filed on Sep. 17, 1999, and 60/154,683, also filed on Sep. 17, 1999, the disclosures of both of which are incorporated by reference herein in their entirety.

BACKGROUND OF THE INVENTION

In electric power steering (EPS) systems some of the highest loads acting upon system components occur when—due to high handwheel rpm and thus high kinetic energy of the system—the system is brought to an abrupt halt at an end-of-travel stop. Such uncontrolled stops inflict high impact forces upon electrical and mechanical components causing high stress and possible failure thereof. Thus, it is desirable to control the speed (and thus kinetic energy) of the system components over the extent of their travel and at critical points, such as when the system approaches an end-of-travel stop.

SUMMARY OF THE INVENTION

A system for controlling the collisions between elements of an automotive rack and pinion steering apparatus at an end-of-travel stop is disclosed. The system comprises sensors for sensing a set of variables of the rack and pinion steering apparatus, namely an angular position of a steering wheel (or linear position of the rack), a rate of change thereof, and the angle (or linear distance for the rack) to an end-of-stop. From this information, a modification factor n may be calculated that is multiplied by a power steering torque assist command (TAC) to produce a modified torque assist command (MTAC). This modified command may represent a reduced torque assist or even a negative torque assist as required to prevent the steering system from striking the end-of-stop too hard.

In an alternative embodiment, the dynamic data is used to calculate a torque limit to be imposed upon the torque assist command whenever the steering system is close to an end-of-stop. The two embodiments may also be superimposed.

The invention reduces torque at end-of-travel impacts, and helps preserve the mechanical integrity of the power steering system.

DETAILED DESCRIPTION OF THE INVENTION

Figure 1:
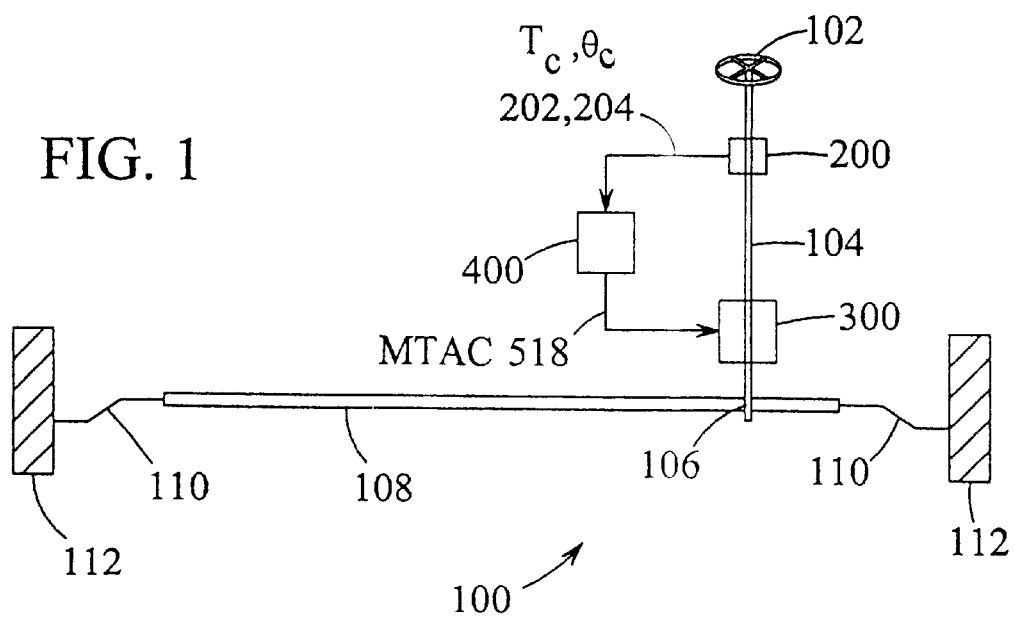
FIG. 1 is a generalized diagrammatic representation of an automotive rack and pinion steering apparatus in communication with a sensor, a motor drive assembly and a controller.

Referring to FIG. 1, there is shown a generalized diagrammatic representation of an automotive rack and pinion steering apparatus 100 in communication with a sensor 200, a motor drive assembly 300, and a controller 400. The rack and pinion steering apparatus 100 generally comprises a steering wheel 102 connected to a steering column 104. The steering wheel 102 is subject to clockwise or counterclockwise steering commands from a driver. The steering column 104 is connected to a rack 108 through a pinion gear 106. The rack 108 is connected to one or more roadwheels 112 through a steering linkage 110. The driver thus is able to steer an automobile by directing the position of the roadwheel 112 through the rack and pinion steering apparatus 100.

Figure 2:
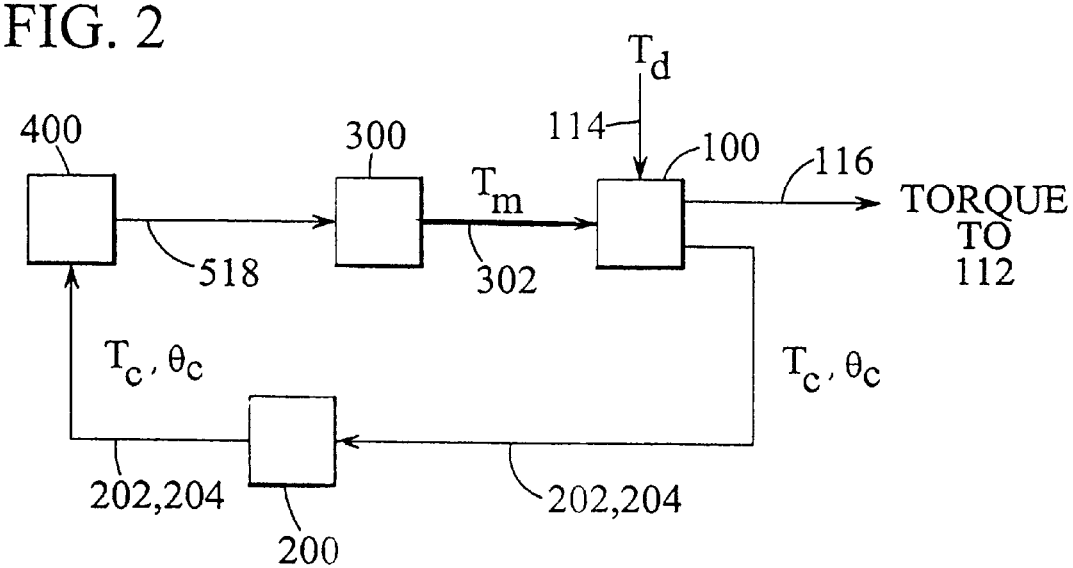
FIG. 2 is a first generalized schematic representation of the signal flow between the automotive rack and pinion steering apparatus and the sensor, the motor drive assembly and the controller of FIG. 1.

Referring to FIG. 2, a first generalized schematic representation of the signal flow between the automotive rack and pinion steering apparatus 100, the sensor 200, the motor drive assembly 300 and the controller 400 of FIG. 1. The rack and pinion steering apparatus 100 is subject to a driver torque, $T_d$, as a result of the driver steering commands; as well as a modified torque assistance, $T_m$ 302, provided by the motor drive assembly 300. The modified torque assistance, $T_m$ 302, is denoted by a heavy arrow to indicate that this connection between the motor drive assembly 300 and the rack and pinion steering apparatus 100 is a mechanical link, rather than a communicative link. The rack and pinion steering apparatus 100 thereby provides roadwheel torque 116 to the roadwheels 112 for steering. The sensor 200 is operative to sense the torque, $T_c$ 202, on the steering column 104 and the angular position, $\theta_c$ 204, of the steering column 104 and to provide measurements thereof to the controller 400. The controller 400 is responsive to $T_c$ 202 and $\theta_c$ 204 and operative thereby to provide as output therefrom a modified torque assist command MTAC 518.

The motor drive assembly 300 is thence responsive to the modified torque assist command MTAC 518 and provides the rack and pinion steering apparatus 100 with the aforesaid modified torque assistance, $T_m$ 302.

Figure 3:
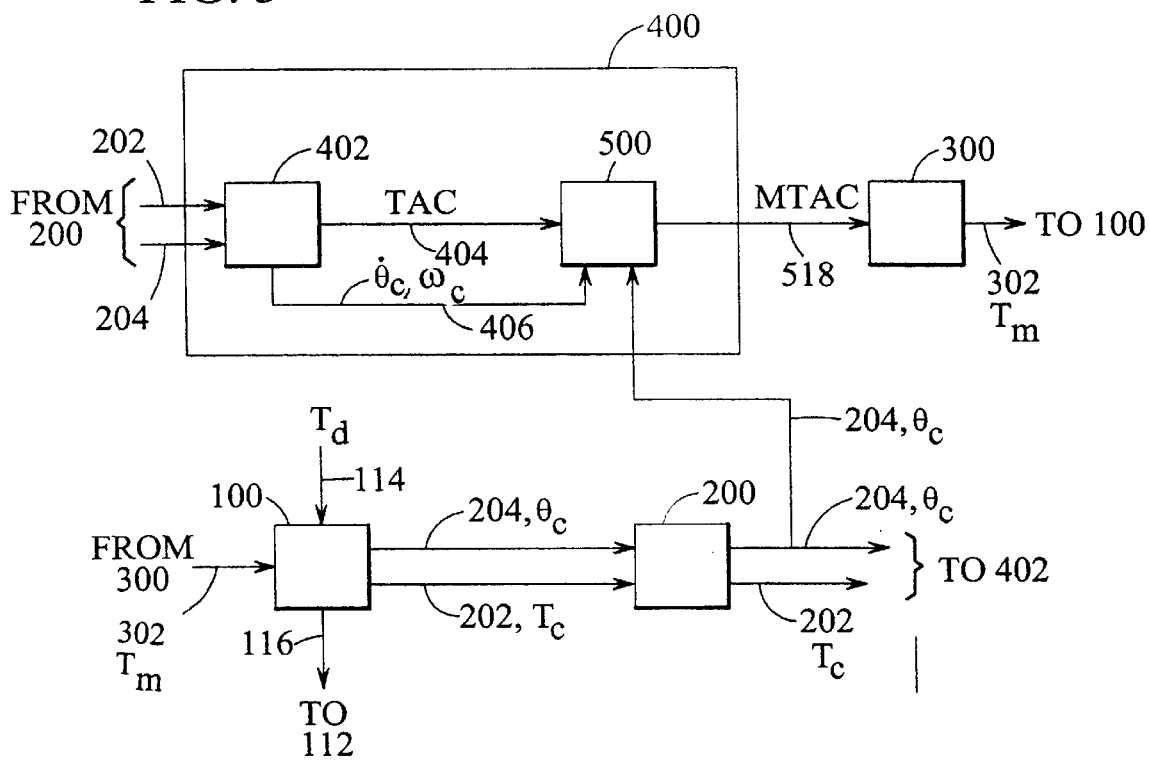
FIG. 3 is a second generalized schematic representation of the signal flow between the automotive rack and pinion steering apparatus and the sensor, the motor drive assembly and the controller of FIG. 1.

Referring to FIG. 3, there is depicted a second generalized schematic representation of the signal flow between the automotive rack and pinion steering apparatus 100, the sensor 200, the motor drive assembly 300 and the controller 400 of FIG. 1. The controller 400 comprises a steering assist subsystem 402 responsive to the torque, $T_c$ 202, on the steering column 104 and the angular steering position, $\theta_c$ 204, and operative thereby to provide as output therefrom a torque assist command TAC 404 and the angular velocity, $d\theta_c/dt = (\dot{\theta}_c) = \omega_c$ 406, of the steering column 104. The torque assistance command, TAC 404, is such that, absent the effect of an impact avoidance system 500, a torque assistance, $T_a$, is provided the driver at the steering column 104. In FIG. 3 the impact avoidance system 500 is responsive to the torque assist command TAC 404, the angular velocity, $\omega_c$ ($\dot{\theta}_c$) 406, an the angular steering position signal, $\theta_c$ 204 and operative thereby to provide as output therefrom a modified torque assist command, MTAC 518. The modified torque assist command, MTAC 518, is conveyed to the motor drive assembly 300 whereupon modified torque assistance, $T_m$, is provided to the driver.

Impact Avoidance Systems

Two preferred embodiments of an impact management system are disclosed. The first calculates a modification factor, m 514, to be multiplied by the torque assist command TAC 404 to provide the modified torque assist command, MTAC 518. The other embodiment calculates a torque limit. If the torque assist command, TAC 404, exceeds the torque limit, then the torque assist command is adjusted accordingly so as to produce the MTAC 518. Both embodiments may be implemented simultaneously on the same system.

Modification Factor Embodiment

Reference will now be had to FIGS. 4 through 11, which refer to the modification factor embodiment of the invention.

Figure 4:
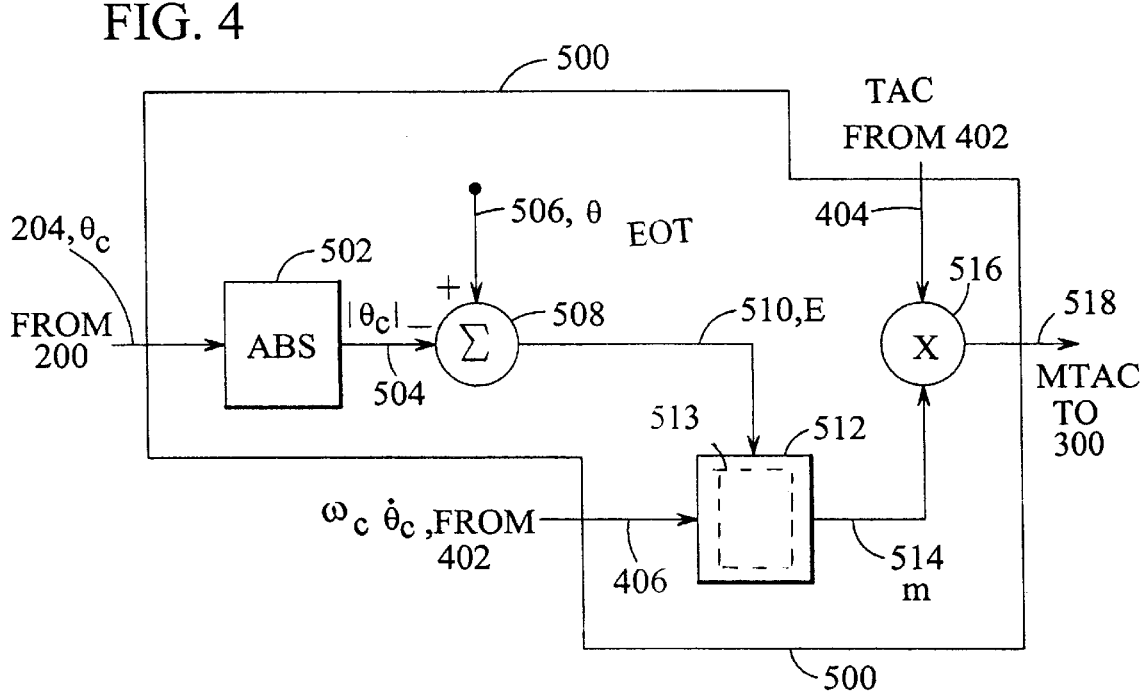
FIG. 4 is a generalized schematic representation of the signal flow the control system.
Figure 5:
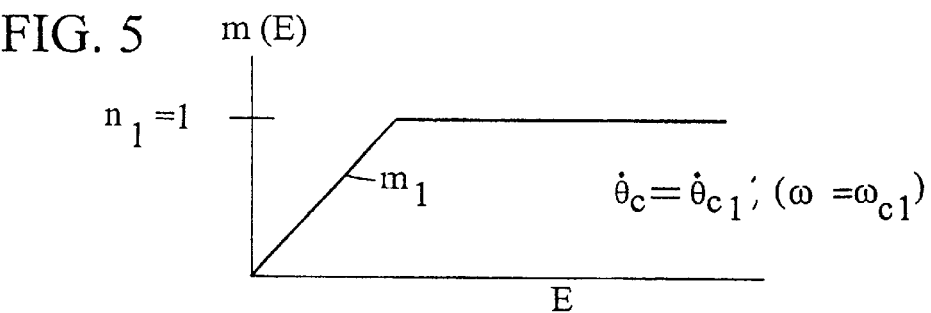
FIG. 5 is a first exemplary graphical representation of the functional relationship between the error signal and a dimensionless number n.
Figure 6:
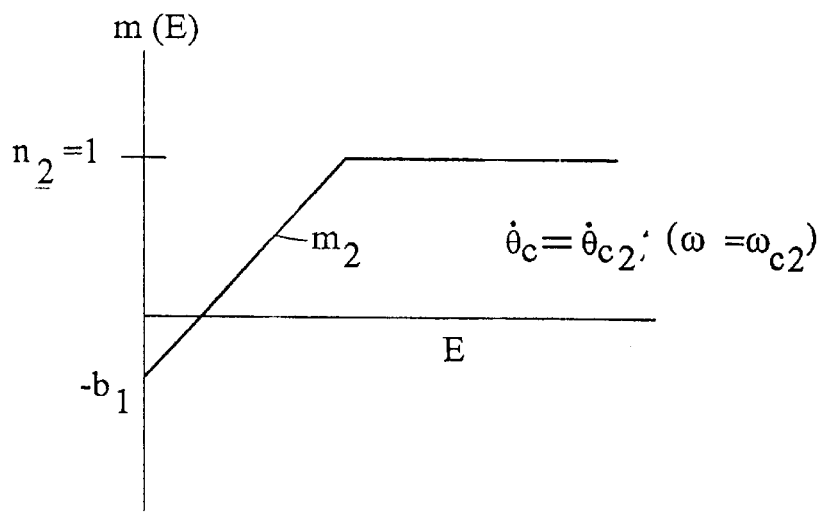
FIG. 6 is a second exemplary graphical representation of the functional relationship between the error signal and a dimensionless number n.
Figure 7:
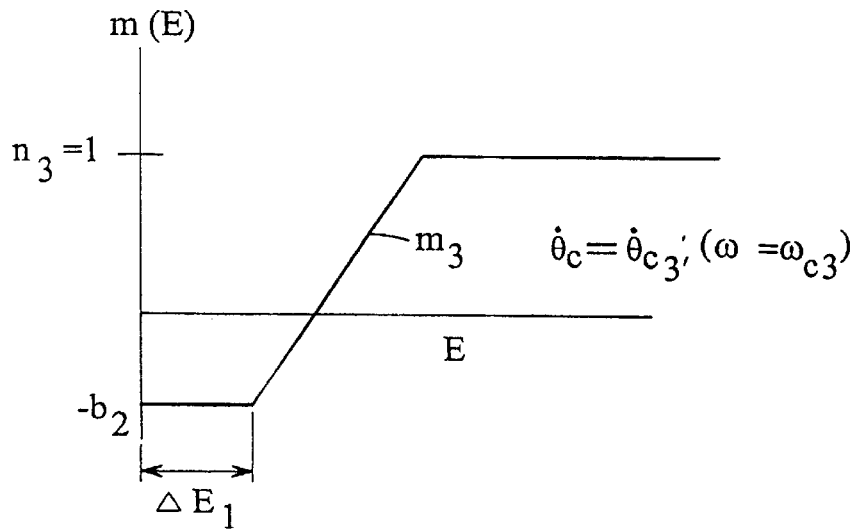
FIG. 7 is a third exemplary graphical representation of the functional relationship between the error signal and a dimensionless number n.
Figure 8:
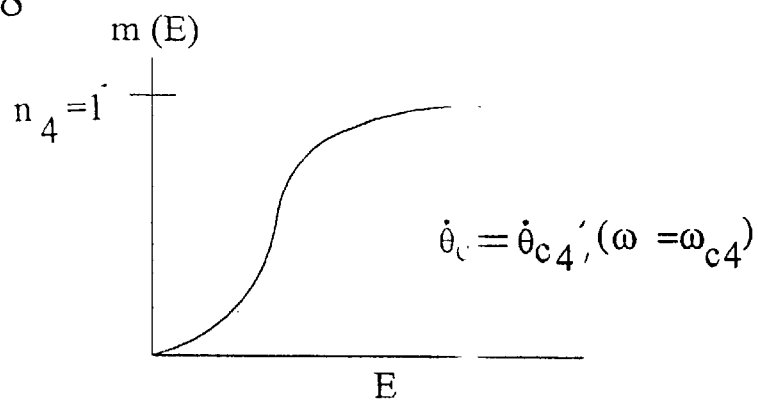
FIG. 8 is a fourth exemplary graphical representation of the functional relationship between the error signal and a dimensionless number n.
Figure 9:
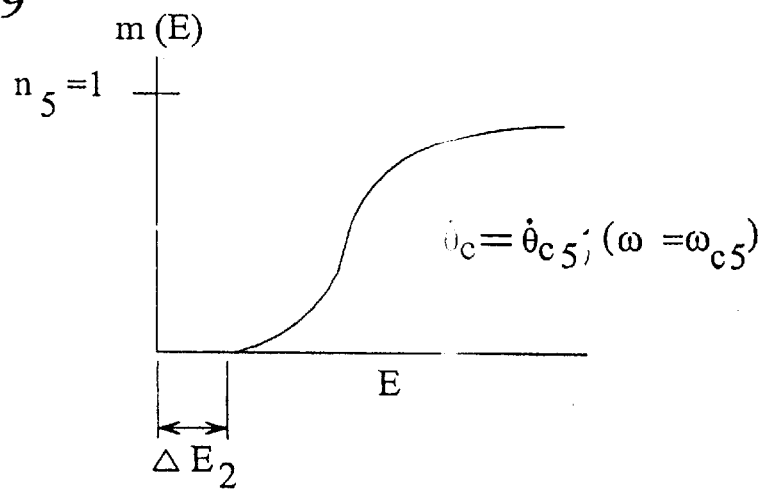
FIG. 9 is a fifth exemplary graphical representation of the functional relationship between the error signal and a dimensionless number n.
Figure 10:
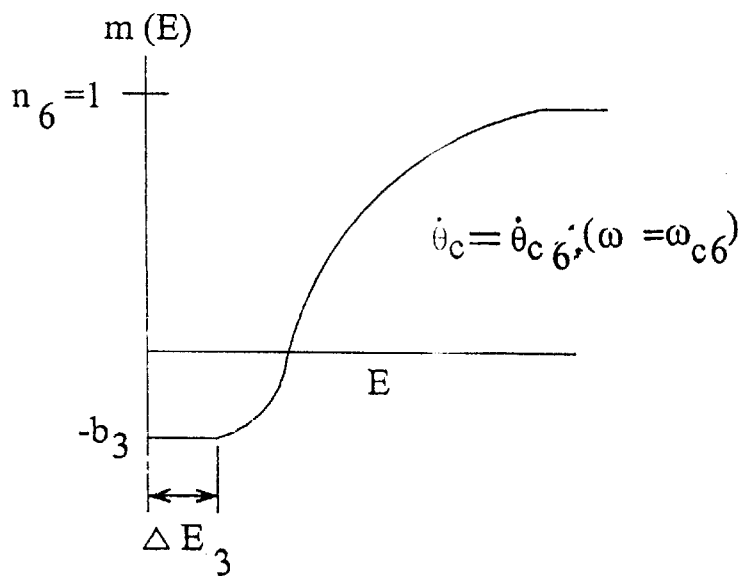
FIG. 10 is a sixth exemplary graphical representation of the functional relationship between the error signal and a dimensionless number n.

Referring to FIG. 4, there is depicted a generalized schematic representing the signal flow of the impact avoidance system 500 of the invention. In FIG. 4, the angular steering position, $\theta_c$ 204, originating from the sensor 200, is operated on by an absolute value operator 502 producing the absolute value, $|\theta_c|$ 504, of the angular steering position $\theta_c$ 204. An end-of-travel set point, $\theta_{cot}$ 506 is provided. The end-of-travel $\theta_{cot}$ 506 point is the value that the angular steering position, $\theta_c$ 204 would be when the rack and pinion steering apparatus 100 has reached end-of-travel. The difference between $|\theta_c|$ 504 and $\theta_{cot}$ 506 is calculated by a summing junction 508 yielding as output therefrom an error signal, E 510. The error signal, E 510, is indicative of the angular distance to the end-of-travel. The error signal, E 510, and the angular velocity, $\omega_c$ ($\dot{\theta}_c$) 406 are thence provided to a database 512. Based upon the error signal, E 510, the angular velocity, $\omega_c$ ($\dot{\theta}_c$) 406 of the steering column 104, and a predefined function, $f_i(E, \theta)$, a number, $n = f_i$ (E, $\theta$), 514 having a value $-1 \leq n \leq +1$ is generated as output from the database 512. In the alternative, based upon the angular velocity, $\omega_c$, the database 512 is entered and a table is chosen whereby the number n $514 = f_j(E)$ such that n has a value $-1 \leq n \leq +1$. The nature of the $f_j(E)$ is made clear by exemplary functions shown in FIGS. 5 through 8 of the drawings. FIG. 5 is a linear function of E, with a predetermined slope, $m_1$, from the origin to a value of $n_1 = 1$. FIG. 6 is a linear function of E, with a predetermined slope, $m_2$, and a predetermined y intercept, $-b_1$, to a value of $n_2 = 1$. FIG. 7 is a linear function of E, with a predetermined slope, $m_3$, and a predetermined y intercept, $-b_2$, to a value of $n_3 = 1$, with a dead band, $\Delta E_1$. FIG. 8 is a nonlinear function of E increasing from the origin and asymptotically approaching $n_4 = 1$. FIG. 9 is a nonlinear function of E increasing from a dead band value, $\Delta E_2$, and asymptotically approaching $n_5 = 1$. FIG. 10 is a nonlinear function of E increasing from a y intercept, $-b_3$ and asymptotically approaching $n_6 = 1$, with a dead band value, $\Delta E_3$. In either case, the number n 514 is multiplied in a multiplier 516 (FIG. 4) by the torque assist command TAC 404 to provide the modified torque assist command, MTAC 518, which is then conveyed to the motor drive assembly 300. The nature of the modified torque assist command, MTAC 518, is such that if n<0, the modified torque, $T_m$, is such as to provide negative, or counter, torque assistance, $T_a$, in some fractional amount, $n \cdot T_a$, and thus aid in avoidance of the aforesaid collision between elements of the rack and pinion steering apparatus 100 and an end-of-travel stop. If n=0 then the no torque assistance is provided, i.e., $T_a = T_m = 0$. If n>0 the modified torque, $T_m$, is some positive fractional amount of the aforesaid torque assistance. Of course, n=1 indicates that $T_m = T_a$.

The motor drive assembly 300 thence provides the modified torque assistance, $T_m$, at the steering column 104 (or rack 108) to aid in the avoidance of a collision between elements of the rack and pinion steering apparatus 100 and an end-of-travel stop. It will be appreciated by one skilled in the art that, though the angular steering position, $\theta_c$ 204 and the angular velocity, $\omega_c$ ($\dot{\theta}_c$) 406 is referred to in this disclosure, it is also possible to utilize, for example, the linear position, $L_c$, of the rack 108 instead. This is so in that $\theta_c$ 204 and $L_c$ differ only by a multiplicative constant, k, representative of the gear ratio between the steering column 104 and the rack 108, i.e., $\theta_c = k \cdot L_c$ and $\omega_c = k \cdot dL_c/dt$.

Figure 11:
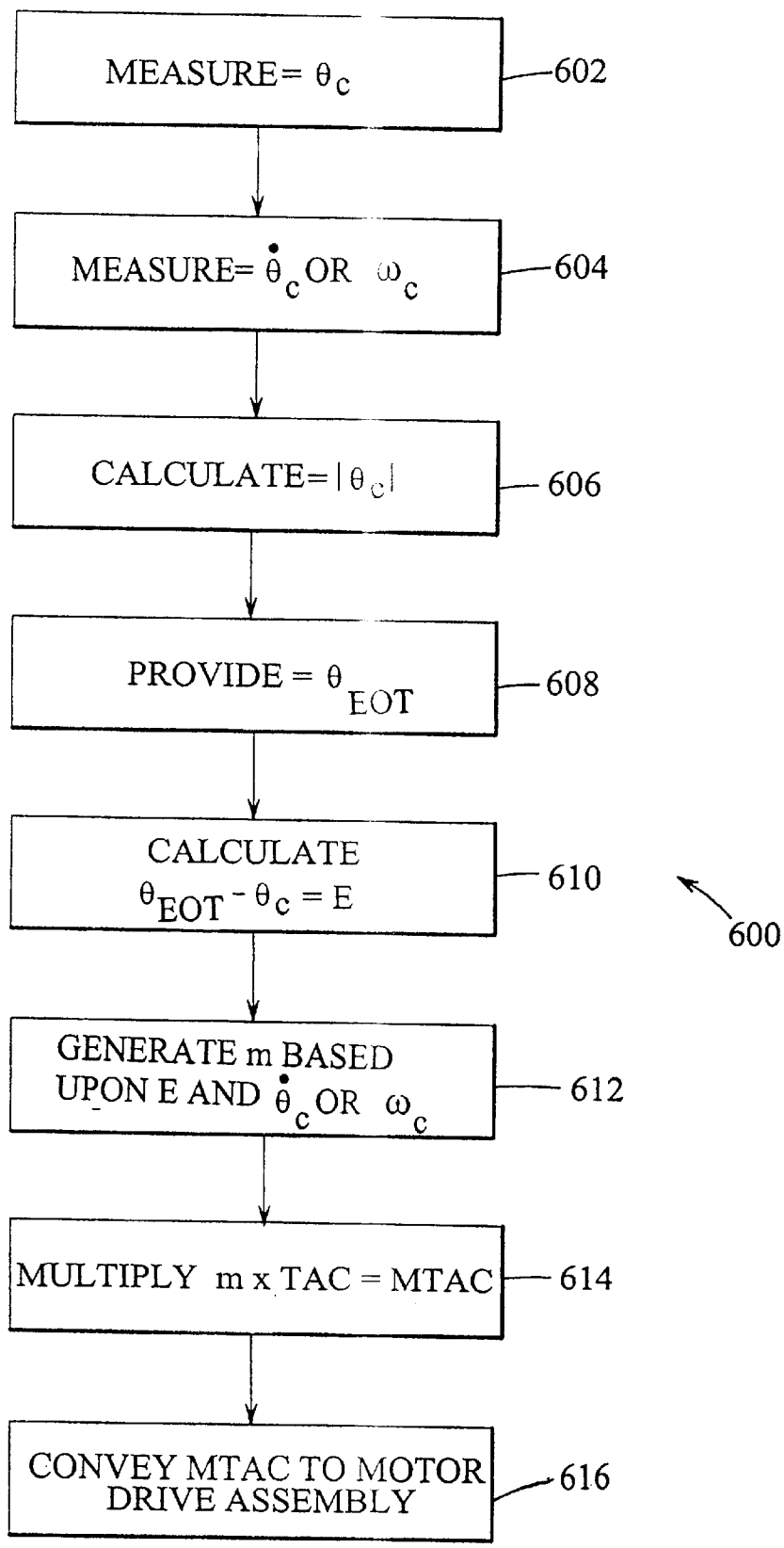
FIG. 11 is a flow chart of the modification factor embodiment disclosed herein.

Reference will now be had to FIG. 11. Therein depicted is a flow chart 600 of the method of the invention. In box 602 the angular steering position, $\theta_c$, 204 is measured. In box 604 the angular velocity $\omega_c$ ($\dot{\theta}_c$) 406 is measured. In box 606 the absolute value, $|\theta_c|$ 504, of the angular steering position $\theta_c$, 204 is calculated. In box 608 a set point value $\theta_{cot}$ 506 is provided, representing the end-of-travel of the steering system. In box 610 the difference between $\theta_{cot}$ 506 and $|\theta_c|$ 504 is calculated yielding an error signal, E 510. In box 612 a dimensionless number, n 514, is generated from a database 512 based upon the error signal, E 510, and the angular velocity $\omega_c$ ($\dot{\theta}_c$) 406. In box 614 the dimensionless number, n 514, is multiplied by the torque assist command, TAC 404, yielding a modified torque assist command, MTAC 518. In box 616 the modified torque assist command, MTAC 518, is conveyed to the motor drive assembly 300 whereupon the nature of the modified torque assist command, MTAC 518, is such that if n<0, the modified torque, $T_m$, is such as to tend to reverse or counter the aforesaid torque assistance, $T_a$, by some fractional amount, $n \cdot T_a$, and thus aid in avoidance of the aforesaid collision between elements of the rack and pinion steering apparatus 100 and an end-of-travel stop. If n=0 then the no torque assistance is provided, i.e., $T_a = T_m = 0$. If n>0 the modified torque assistance, $T_m$, is some fractional amount of the aforesaid torque assistance, $T_a$, i.e., $T_m = n \cdot T_a$.

Torque Limit Embodiment

Reference will now be had to FIGS. 12 through 15, which refer to the torque limit embodiment of the invention. In this embodiment, there is produced a torque limit on the steering assist motor that sets a maximum value for the assist motor torque. There may, however, be several different torque limiting systems operating simultaneously in the power steering system, the most common of which will be an upper torque assist limit that decreases with increasing vehicle speed or engine RPM, thereby preventing undesirable power steering "wobble" at high speeds. In the most preferred embodiment, the torque limit produced by this torque limit system will be used as a limiting torque value only if all of the other torque limiting systems produce a greater torque limit value. That is, the controller compares a plurality of torque limit values that are produced by the various torque limiting systems, and applies the lowest value to the motor.

Limitation of assist torque to reduce the energy in end-of-travel impacts is generally not desired until the steering system is approaching an end-of-travel, $\theta_{cot}$ 506. The torque assist torque command (TAC) 402 is therefore preferably limited only when the angular steering position, $\theta_c$ 204, passes a defined threshold angle off of its on-center position. The threshold angle is the angle from on-center beyond which actual motor torque is limited by the controller because of the end-of-travel impact assist torque limit. The invention uses a function dependent upon the actual, $\theta_c$ 204, or estimated position of the steering wheel to determine the assist torque limit, and therefore can be programmed to limit torque only when the steering wheel moves past the threshold angle.

The following equation is the equation used to determine the torque assist limit produced by the system in one embodiment of the invention:

$$TL = M(\omega_c - \omega_{int})$$

where M is the defined slope of the function, TL is the torque limit, $\omega_c$ is the angular velocity of the steering column, and $\omega_{int}$ is the angular velocity intercept, which is a value determined by the actual or estimated angular position of the steering wheel.

Figure 12:
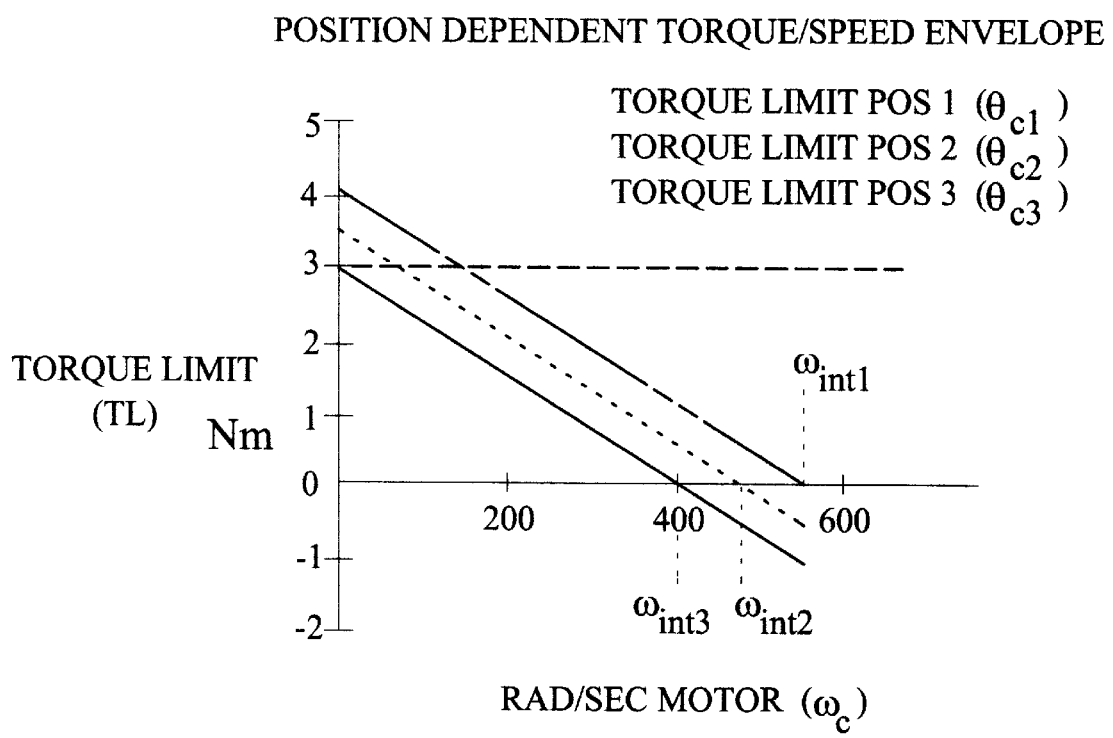
FIG. 12 is a graph showing exemplary assist torque limit curves for three different angular steering positions for the torque limit embodiment.

A representative graph of three torque limit equations is shown in FIG. 12. Each line represents the equation used to determine assist torque limit for a particular angular steering position, $\theta_c$ 204. The Y-axis represents the torque limit (motor torque maximum), and the X-axis represents the speed of the system. The line corresponding to torque limit Position 1, $\theta_{c1}$, represents an angular steering position, $\theta_c$ 204, that is closer to center than either the line representing torque limit Position 2, $\theta_{c2}$, or torque limit Position 3, $\theta_{c3}$. As angular steering position, $\theta_c$ 204, approaches the end-of-travel, $\theta_{cot}$ 506 the angular velocity intercept, $\omega_{int}$, of the function used to determine torque limit is decreased. The invention may utilize a table of defined angular velocity intercept values that correspond to various angular steering positions, $\theta_c$ 204.

Although the three torque limit position lines shown in FIG. 12 show torque limit values exceeding 3 Nm, in operation other torque limiting systems will generally signal the controller to limit assist torque to values below 3 Nm (as shown by the dashed line). Note that these torque limit values and ranges are merely illustrative and will, of course, vary from system to system in actual application. Notice that negative torque limit values are shown in FIG. 12 for steering rates $\omega_c$ 406, that exceed the angular velocity intercept value $\omega_{int}$. In this case, the controller can set a zero torque limit, which would entirely remove motor assist torque from the steering system or, optionally, the controller could have the motor generate a negative torque in opposition to the steering motion.

The slope M of the three lines in the example of FIG. 12 is approximately $$M = -0.0075 \frac{Nm}{Rad/Sec}.$$

This slope is one example of a defined slope that could be used in the invention, and is an example of a slope value that limits torque so that an approximately equivalent end-of-travel impact force occurs at all angular velocities, $\omega_c$ ($\dot{\theta}_c$) 406. The slope can be set at a value that will yield approximately equivalent force during end-of-travel impacts among varying angular velocities, $\omega_c$ ($\dot{\theta}_c$) 406, or any other value that protects the integrity of the mechanical components of the steering system.

Defining the slope value, M, based on desired impact range and the angular velocity intercept value, $\omega_{int}$, based on the angular steering position, $\theta_c$ 204, establishes the equation of the line, and allows the controller to use the equation appropriate for the angular steering position, $\theta_c$ 204 to compute a maximum assist torque based on the angular velocity, $\omega_c$ ($\dot{\theta}_c$) 406. The angular velocity intercept values, $\omega_{int}$, assigned to the angular steering positions, $\theta_c$ 204, may be assigned in a linear fashion. If the three angular steering positions shown in FIG. 12 are evenly spaced, for example, then their respective angular velocity intercepts, $\omega_{int}$, are decreasing linearly from the angular velocity intercept, $\omega_{int1}$, assigned to position 1, $\theta_{c1}$, to the angular velocity intercept, $\omega_{int3}$, assigned to position 3, $\theta_{c3}$.

The angular velocity intercepts, $\omega_{int}$, however, need not be linearly arranged with the angular steering position, $\theta_c$ 204. Angular velocity intercept values, $\omega_{int}$, can vary linearly, piecewise linearly, or nonlinearly, depending on the application. Regardless of their arrangement, however, angular velocity intercept values, $\omega_{int}$, over the range of angular steering positions $\theta_c$ 204, from on-center to the threshold position on either side of center will be large enough to prevent torque limits that reduce the assist torque. That is, the defined angular velocity intercepts, $\omega_{int}$, when used in the torque limit equation, will produce a torque limit that exceeds the actual motor torque as determined by the controller based on other inputs. Therefore, no limiting of torque from the end-of-travel impact management system will occur when the angular steering position, $\theta_c$ 204, is between on-center and the threshold positions.

An angular velocity intercept lookup table 513 can be included as part of the database 512 of FIG. 4. Hence, both the modification factor embodiment and the torque limit embodiment disclosed herein may coexist simultaneously in the same power steering system structure as shown in FIGS. 1 through 4. The lookup table 513 stores defined angular velocity intercepts, $\omega_{int}$, for different angular steering positions, $\theta_c$ 204. The angular velocity intercept lookup table 513 may be physically located within the controller 400, or may be in any location that is in communication with the controller 400. Angular velocity intercept values, $\omega_{int}$, can also be calculated from defined formulas that use defined on-center, threshold, and end-of-travel angles, $\theta_{cot}$ 506, to interpolate angular velocity intercept values, $\omega_{int}$, for any angular steering position, $\theta_c$ 204.

After receiving data from the various input sources, the controller 400 determines the correct end-of-travel assist torque limit value, TL. The torque limit value, TL, will then be used to limit the controller output torque value, MTAC, if the controller 400 determines that the torque limit value, TL, is the smallest torque limit produced by the plurality of torque limiting systems. The torque limit value, TL, generated by the system will be used only if the output torque, value, MTAC 518 otherwise specified by the controller 400 for the motor is larger than the torque limit value, TL.

Figure 13:
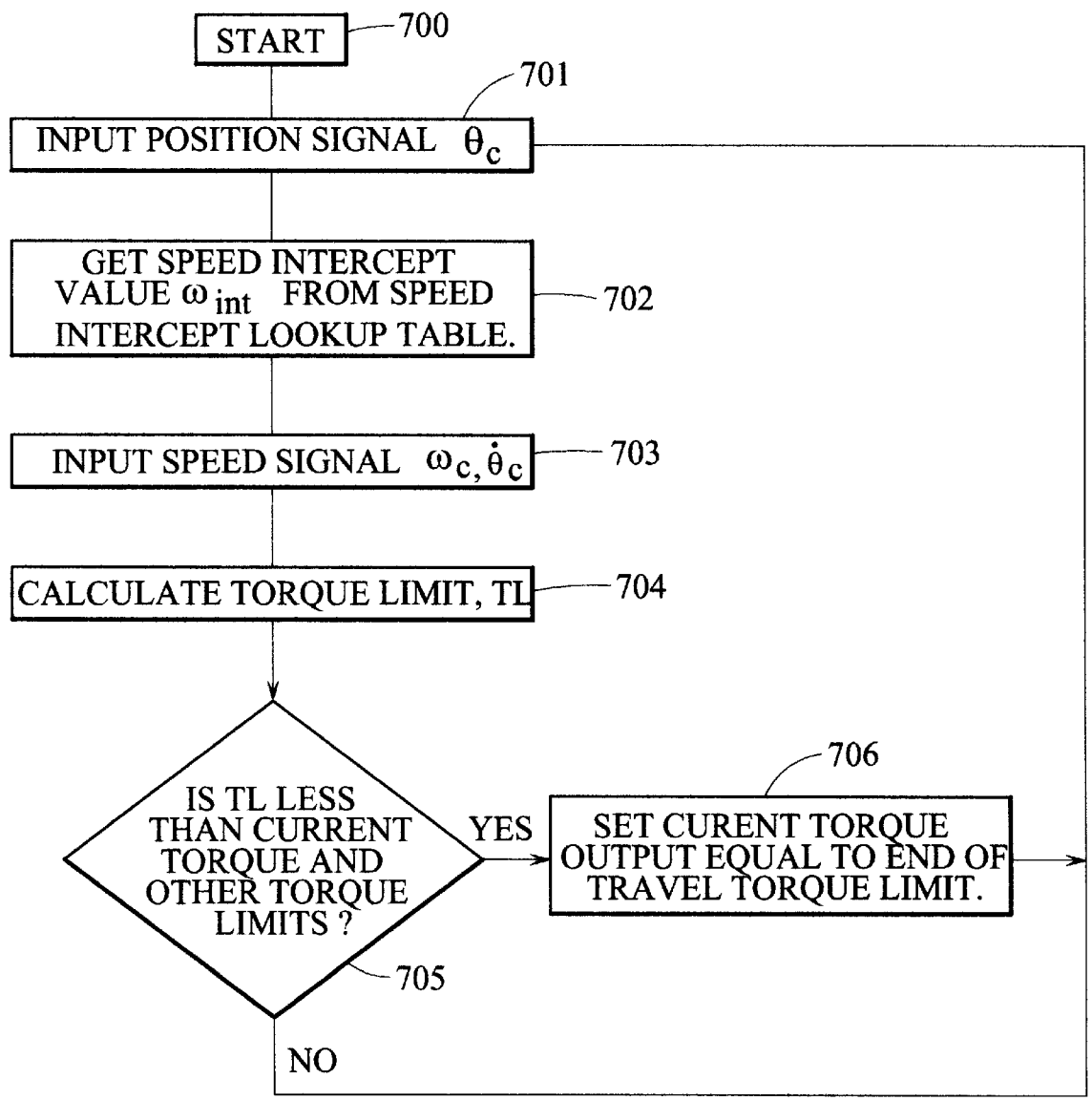
FIG. 13 is a flow diagram representing the algorithm used in the torque limit embodiment.

FIG. 13 shows the algorithm used by the system to compute and apply the torque limit value, TL, to the motor. In step 700 the algorithm is started. Step 700 will generally correspond to vehicle start up or electrical start up, In step 701, the angular steering position signal, $\theta_c$ 204, is input to the controller 400. In step 702, the angular steering position value $\theta_c$ 204, is used by the controller 400 to retrieve the matching angular velocity intercept value from the angular velocity intercept lookup table 513. Alternatively, the angular steering position value $\theta_c$ 204 can be used in a sub-routine function to interpolate angular velocity intercepts based on defined angular velocity intercept values for on-center, threshold, and end-of-travel positions. In step 703, the angular velocity signal, $\omega_c$ ($\dot{\theta}_c$) 406, is input to the controller 400. In step 704, the controller 400 uses the values obtained in step 701–703 and the equation for torque limit to compute the end-of-travel assist torque limit. In step 705, the torque limit produced in step 704 is compared to the current output torque value, MTAC 518, and the torque limits produced by the other torque limiting systems. If the torque limit value is greater than the current output torque value, MTAC 518, or any of the torque limits of the other torque limiting systems, then flow proceeds to step 701 and the controller 400 checks for new sensor values. If, alternatively, the torque limit value produced in step 704 is less than the current output torque value, MTAC 518, and all of the torque limits produced by the other torque limiting systems, then the current output torque value, MTAC 518, is changed to the end-of-travel assist torque limit value, TL, in step 706, and flow proceeds to step 701. Optionally, the angular velocity value, $\omega_c$, can be taken before the angular steering position, $\theta_c$ 204, is determined in step 701 or before the angular velocity intercept, $\omega_{int}$, is retrieved in step 702.

Figure 14A:
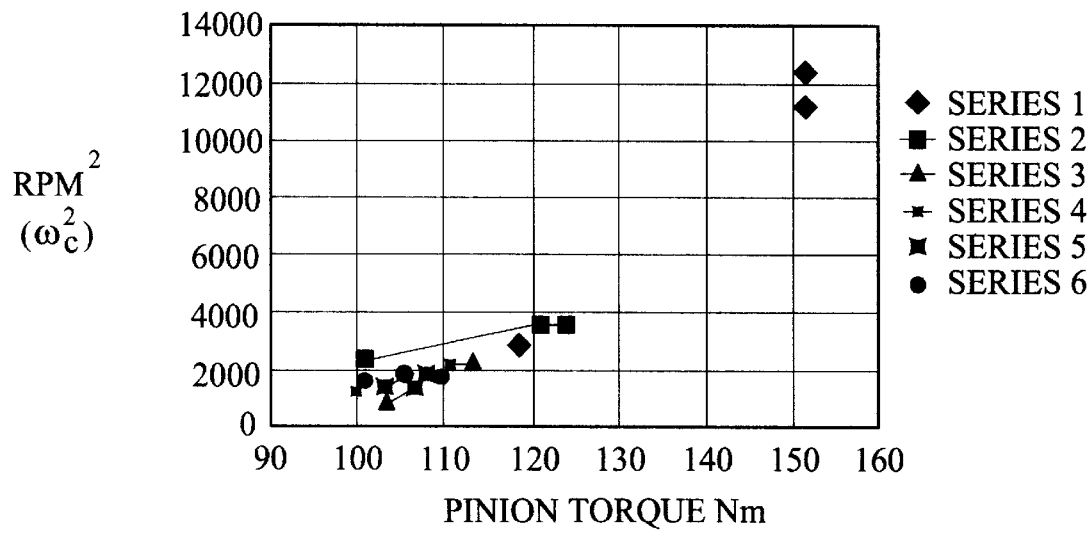
FIGS. 14A and 14B show scatter plots of rotations per minute squared versus pinion torque for torque-limit-protected and unprotected systems.
Figure 14B:
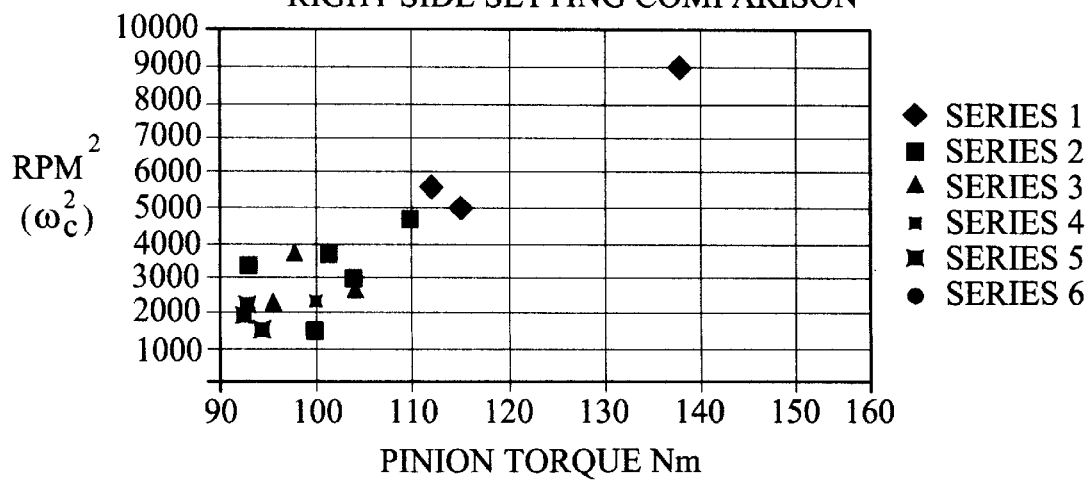

FIGS. 14A and 14B show illustrative torques on the pinion of the steering column for the left side and the right side for several end-of-travel impacts. The Y-axis represents the square of the angular velocity, $\omega_c^2$, at the steering wheel. Because system inertia (I) is the same for each trial condition, rotations per minute squared values represent the relative kinetic energy of each trial. The X-axis represents the torque on the pinion gear in Newton meters. Five sample algorithms (series) are shown to reduce the end-of-travel impacts relative to an electric steering system without end-of-travel torque limit protection.

In another embodiment, the actual steering angular steering position, $\theta_c$ 204, is not known when the system is started. Because the angular velocity intercept value, $\omega_{int}$, is determined in relation to the angular steering position, $\theta_c$ 204, and no actual angular steering position is known at start, the system must assume an initial angular steering position. If the angular steering position corresponding to the end-of-travel angular velocity intercept value is used as the initial angular steering position value, the torque limit produced by the system will be maximally protective. If, however, the system changes the assumed position value to the actual value, $\theta_c$ 204, too suddenly, undesirable unevenness in steering assist could be created. To prevent this, the angular steering position value is "walked" towards its actual value, $\theta_c$ 204, and the torque limit produced by the system is gradually adjusted until it matches the value that would have been produced by a system that indicated actual angular steering position, $\theta_c$ 204, at start up.

Figure 15:
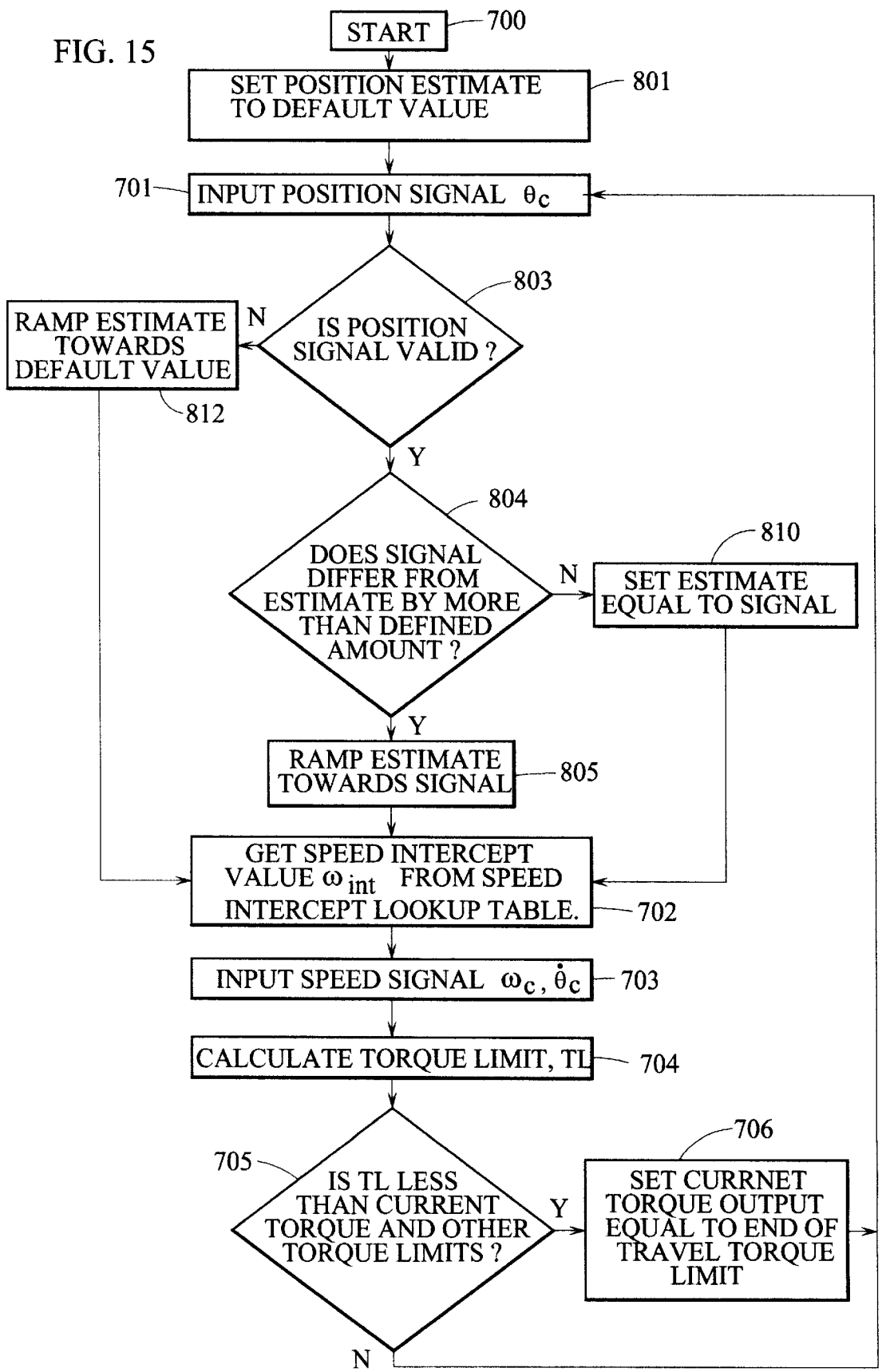
FIG. 15 is a flow diagram of an end of torque limit system that does not initially use an actual steering angular position signal.

FIG. 15 shows a preferred embodiment of a torque limit algorithm that could be used in an end-of-travel impact management system that does not use an absolute angular position signal, $\theta_c$ 204, immediately upon start up 700. Steps that are identical to those in FIG. 13 are numbered identically in this drawing, while new steps are numbered in the 800s for easy comparison. Step 801 is performed immediately upon start up 700 of the system, and entails setting an angular steering position estimate to a default value, which can be the end-of-travel value or any other value that provides the desired protection against end-of-travel impacts. Flow then proceeds to step 701, where an angular position signal, $\theta_c$ 204, is input to the controller as in FIG. 13.

If the angular position signal, $\theta_c$ 204, is found to be valid in step 803, then flow proceeds to step 804, where the controller 400 compares the actual position value, $\theta_c$ 204, input in step 701 to the angular steering position estimate value. The angular steering position estimate default value set in step 801 will be the angular steering position estimate value the first time flow reaches step 804. If the angular steering position estimate value differs from the actual position value $\theta_c$ 204, by more than a defined amount, then flow proceeds to step 805 where the angular steering position estimate value is adjusted (gradually) toward the actual position, $\theta_u$ 204, at a specified rate, this rate being gradual enough so as not to generate a noticeable change from steering feel. After several passes, the difference between the angular steering position estimate and the actual position, $\theta_c$ 204, will fall below the threshold value defined in step 804, and flow will proceed to step 810, where the estimate value is set to the actual value, $\theta_c$ 204. Subsequent passes will flow through step 810 and the system will function without walking steps. If in step 803 the system determines the angular position signal is not valid, then the angular steering position estimate is ramped toward the default value set in step 801. In either case, flow then proceeds to steps 702 through 706 as before and then returns to step 701, where an angular position signal, $\theta_c$ 204, is again input.

Other embodiments include a formulation with a fixes torque limit equation having only one angular velocity intercept, $\omega_{int}$. In this embodiment, the angular steering position value, $\theta_c$ 204, input is scaled with a position-dependent constant. The net effect of such scaling is to produce torque limits, TL, that are similar to those produced in a system that uses multiple angular velocity intercepts, $\omega_{int}$.

Another embodiment uses a non-linear torque limit function. The torque limit function in this embodiment is designed to have a more negative slope, M, at greater angular velocity, $\omega_c$ ($\dot{\theta}_c$) 406, values. As in the first embodiment, angular velocity intercept values, $\omega_{int}$, are defined for different angular steering positions, $\theta_c$ 204, and torque limit values, TL, are determined after angular velocity intercept values, $\omega_{int}$, are derived. This embodiment allows for nonlinear increases in torque limits, TL, at given angular steering position, $\theta_c$ 204, as angular velocity values, $\omega_c$ ($\dot{\theta}_c$) 406, increase.

Another embodiment uses a closed loop structure. In this embodiment, a target angular velocity corresponding to the desired amount of kinetic energy is computed as a function of angular steering position, $\theta_c$ 204. A look-up table can be used to define the target angular velocity values. Torque limits, TL, are decreased if the target angular velocity is less than the actual angular velocity, $\omega_c$ ($\dot{\theta}_c$) 406, and increased if the target angular velocity is greater that the actual angular velocity, $\omega_c$ 406. An integrator coefficient is multiplied by the difference between actual, $\omega_c$ ($\dot{\theta}_c$) 406, and target angular velocity to arrive at the desired torque limit, TL.

While referred embodiments have been shown and described, various modifications and substitutions may be made thereto without departing from the spirit and scope of the invention. Accordingly, it is to be understood that the invention has been described by way of illustration only, and such illustrations and embodiments as have been disclosed herein are not to be construed as limiting to the claims.

What is claimed is:

1. A system for controlling collisions between elements of an automotive rack and pinion steering apparatus and an end-of-travel stop, said system comprising:
   a sensor for sensing a set of dynamic variables of said rack and pinion steering system and operative thereby to generate as output therefrom a first set of signals indicative of said set of dynamic variables;
   a controller responsive to said first set of signals and operative thereby to provide as output therefrom a modified torque assist command signal; and
   a motor drive assembly responsive to said modified torque assist command signal and operative thereby to provide torque assist to said rack and pinion steering system.

2. The invention of claim 1 wherein said set of dynamic variables of said rack and pinion steering system comprises:
   an angular steering position of said steering column of said rack and pinion steering system; and
   a torque acting upon said steering column.

3. The invention of claim 1 wherein said controller comprises:
   a steering assist subsystem responsive to said first set of signals and operative thereby to provide as output therefrom
      a torque assist command; and
      an angular velocity command; and
   an impact avoidance control subsystem responsive to
      said torque assist command;
      said angular velocity command and
      a first signal of said first set of signals; and
   wherein said avoidance control subsystem is operative thereby to provide as output therefrom said modified torque assist command.

4. The invention of claim 3 wherein said impact avoidance control subsystem comprises:
   an absolute value operator responsive to said first signal of said first set of signals and operative thereby to provide as output therefrom said absolute value of said first signal of said first set of signals;
   an end-of-travel angular steering position of said steering column;
   a summing junction operative to provide as output therefrom an error signal equal to said difference between said absolute value of said first signal of said first set of signals and said end-of-travel angular steering position of said angular steering position of said steering column;
   a database operative to accept as input thereto said error signal and said angular velocity command and operative thereby to provide as output therefrom a number having a value from −1 to +1 inclusive; and
   a multiplier operative to multiply said number output from said database by said steering assist command providing thereby a modified torque assist command.

5. A method of controlling collisions between elements of an automotive rack and pinion steering apparatus and an end-of-travel stop, said method comprising:
   providing a sensor for sensing a set of dynamic variables of said rack and pinion steering system and operative thereby to generate as output therefrom a first set of signals indicative of said set of dynamic variables;
   providing a controller responsive to said first set of signals and operative thereby to provide as output therefrom a modified torque assist command signal; and
   providing a motor drive assembly responsive to said modified torque assist command signal and operative thereby to provide torque assist to said rack and pinion steering system.

6. The method of claim 5 wherein sensing said set of dynamic variables of said rack and pinion steering system comprises:
   sensing an angular steering position of said steering column of said rack and pinion steering system; and
   sensing a torque acting upon said steering column.

7. The method of claim 5 wherein providing said controller comprises:
   providing a steering assist subsystem responsive to said first set of signals and operative thereby to provide as output therefrom
      a torque assist command and
      an angular velocity command; and
   providing an impact avoidance control subsystem responsive to
      said torque assist command,
      said angular velocity command and
      a first signal of said first set of signals; and
   wherein said avoidance control subsystem is operative thereby to provide as output therefrom said modified torque assist command.

8. The method of claim 7 wherein providing said impact avoidance control subsystem comprises:
   providing an absolute value operator responsive to said first signal of said first set of signals and operative thereby to provide as output therefrom said absolute value of said first signal of said first set of signals;
   providing a end-of-travel angular steering position of said angular steering position of said steering column;
   providing a summing junction operative to provide as output therefrom an error signal equal to said difference between said absolute value of said first signal of said first set of signals and said end-of-travel angular steering position of said angular steering position of said steering column;
   providing a database operative to accept as input thereto said error signal and said angular velocity command and operative thereby to provide as output therefrom a number having a value from −1 to +1 inclusive; and
   providing a multiplier operative to multiply said number output from said database by said steering assist command providing thereby a modified torque assist command.

9. The method of claim 8 further comprising:
   measuring said angular steering position of said steering column;
   measuring said angular velocity of said steering column;
   calculating an absolute value of said angular steering position of said angular steering position;
   taking said difference between said end-of-travel angular steering position and said angular steering position of said steering column yielding an error signal;
   generating a dimensionless number having a value between −1 and +1 inclusive;
   multiplying said dimensionless number by said torque assistance command yielding a modified torque assistance command; and conveying said modified torque assistance command to said motor drive assembly.

10. An electric power steering system comprising:
a motor drive assembly configured for providing electric power steering, said motor drive assembly responsive to a torque assist command signal;
means for determining an angular steering position of a steering column to produce an angular steering position signal;
means for determining a steering angular velocity of said steering column to produce an angular velocity signal; and,
a controller receptive to said steering angular position signal and said angular velocity signal to generate said torque assist command signal for reducing end-of-travel impact torque in said electric power steering assembly.

11. The invention of claim 10 wherein said torque assist command signal is a decreasing function of angular velocity.

12. The invention of claim 11 wherein said torque assist command signal is a function of angular steering position.

13. The invention of claim 10 wherein said torque assist command signal is a function of angular steering position.

14. The invention of claim 10 wherein said means for determining angular velocity comprises means for indirectly determining angular velocity.

15. The invention of claim 14 wherein said means for indirectly determining angular velocity comprises means for estimating angular velocity based upon differentiated motor drive assembly position or voltage/current measurements of said motor drive assembly.

16. The invention of claim 10 wherein said means for directly determining angular velocity comprises an angular velocity sensor adapted to sense angular velocity at said motor drive assembly, a steering wheel or column, or a rack.

17. The invention of claim 10 wherein said means for determining angular steering position comprises a position sensor adapted to sense angular steering position at said motor drive assembly, a steering wheel, or column, or a rack.

18. The invention of claim 10 wherein said controller generates said control signal according to:

$$TL=M(\omega_c-\omega_{int})$$

where M is a defined slope of said function, TL is a torque limit applied to said motor drive assembly, $\omega_c$ is the angular velocity of said steering column, and $\omega_{int}$ is an angular velocity intercept.

19. The invention of claim 10 wherein said torque assist command signal is further based on comparing an angular steering position value with said steering angular position signal and adjusting said angular steering position value toward said steering angular position signal at a gradual defined rate when said angular steering position value and said steering angular position signal differ by more than a defined amount.

20. A method for reducing end-of-travel torque in an electric power steering assembly, comprising:
producing an angular steering position signal;
producing an angular velocity signal; and,
controlling a motor drive assembly configured for providing electric power steering in response to said steering angular position signal and said angular velocity signal in a manner effective in reducing end-of-travel impact torque in said electric power steering assembly.

21. The method of claim 20 wherein said controlling comprises utilizing a decreasing function of angular velocity.

22. The method of claim 21 wherein said controlling comprises utilizing a function of angular steering position.

23. The method of claim 20 wherein said controlling comprises utilizing a function of angular steering position.

24. The method of claim 20 wherein said producing said angular velocity signal comprises indirectly determining said angular velocity signal.

25. The method of claim 24 wherein said indirectly determining said angular velocity signal comprises estimating angular velocity based upon differentiated motor drive assembly position or voltage/current measurements of said motor drive assembly.

26. The method of claim 20 wherein said controlling is according to:

$$TL=M(\omega_c-\omega_{int})$$

where M is a defined slope of said function, TL is a torque limit applied to said motor drive assembly, $\omega_c$ is the angular velocity of said steering column, and $\omega_{int}$ is an angular velocity intercept.

27. The method of claim 20 wherein said controlling further comprises:
comparing an angular steering position value with said steering angular position signal and adjusting said angular steering position value toward said steering angular position signal at a gradual defined rate when said angular steering position value and said steering angular position signal differ by more than a defined amount.

28. A method for controlling an electric power steering assembly comprising:
producing an angular steering position signal; and,
comparing an angular steering position value with said steering angular position signal and adjusting said angular steering position value toward said steering angular position signal at a gradual defined rate when said angular steering position value and said steering angular position signal differ by more than a defined value.

29. An electric power steering system, comprising:
the system of claim 1; and
the system of claim 10.

30. A method of controlling an electric power steering system, comprising:
the method of claim 5; and
the method of claim 20.

* * * * *